United States Patent

[11] 3,618,019

[72] Inventors Samuel M. Nemirovsky
Rego Park;
Jacob Sternberg, New York; George
Lieberman, New York, all of N.Y.
[21] Appl. No. 876,467
[22] Filed Nov. 13, 1969
[45] Patented Nov. 2, 1971
[73] Assignee Conversational Systems Corp.
New York, N.Y.

[54] SIGNATURE IDENTIFICATION BY MEANS OF PRESSURE PATTERNS
8 Claims, 4 Drawing Figs.

[52] U.S. Cl. 340/146.3 R, 178/18, 235/61.7, 340/149 R
[51] Int. Cl. G06k 9/00
[50] Field of Search 340/146.3, 149 A; 178/18, 19, 20; 235/61.7

[56] References Cited

UNITED STATES PATENTS

| | | | |
|---|---|---|---|
| 3,113,461 | 12/1963 | Peters | 340/146.3 UX |
| 3,127,588 | 3/1964 | Harmon | 340/146.3 |
| 3,394,246 | 7/1968 | Goldman | 340/149 X |
| 3,480,911 | 11/1969 | Danna | 340/146.3 |

OTHER REFERENCES

Smithline, IBM Technical Disclosure Bulletin, " Limited Vocabulary Script Reader," Vol. 7 No. 6 November, 1964. pp. 473- 475

*Primary Examiner*—Maynard R. Wilbur
*Assistant Examiner*—Leo H. Boudreau
*Attorney*—Camil P. Spiecens

ABSTRACT: A system verifies signatures by converting the pressure patterns generated when a person writes his signature to binary coded combinations of signals which are then compared for similarity with previously recorded binary coded combinations of signals representing known signatures.

INVENTORS
SAMUEL M. NEMIROVSKY
JACOB STERNBERG
GEORGE LIEBERMAN
BY

ATTORNEY

INVENTORS
SAMUEL M. NEMIROVSKY
JACOB STERNBERG
BY GEORGE LIEBERMAN
[signature]
ATTORNEY

INVENTORS
SAMUEL M. NEMIROVSKY
JACOB STERNBERG
GEORGE LIEBERMAN
BY
ATTORNEY

SIGNATURE IDENTIFICATION BY MEANS OF PRESSURE PATTERNS

This invention pertains to identification systems and more particularly to such systems utilizing pressure patterns.

Personal identification is required in many areas, such as the admission into classified plants or laboratories, the withdrawal of funds from banks, the picking up of securities, or money or other negotiable instruments by messengers, the charging of goods or services by means of credit cards, etc.

The earliest forms of personal identification relied on were the visual study of signatures. However, it soon became apparent that signature forgeries were quite easy. Accordingly, more sophisticated systems have been proposed, such as finger or handprint comparison, photographic comparisons, etc. While such systems are more reliable than systems utilizing signatures, they require skilled personnel to perform the comparisons. This limitation has been recognized and apparatus has been proposed and built to perform "machine" comparisons. However, such apparatus is very complex because of the amount of information that must be processed.

It is, accordingly, a general object of the invention to provide a method for mechanically identifying a person which is more reliable than mere signature comparison and less complex than fingerprint comparison or its equivalents.

Briefly, the invention contemplates a method for checking the identity of a person by comparing a pressure pattern which the person generates while writing his signature with a previously recorded pressure pattern of the signature. While it is stated that the pressure pattern results from the writing of the signature it should be apparent that the person could write any preassigned series of symbols and this would be operatively equivalent to the signature. Furthermore, by writing is not necessarily meant the production of a visual image of the signature, but merely the physical act of using a pen or stylus against a platen or the like while tracing out the signature or equivalent.

Applicant has discovered that when writing a signature a person produces a unique pressure pattern. If a forger copies the signature so that the copy cannot be visually detected, the pressure pattern while copying the signature will be different from the pressure pattern generated when the true owner of the signature writes the signature.

Other objects, the features and advantages of the invention will be apparent from the following detailed description when read with the accompanying drawing which shows apparatus for practicing the invention.

Before proceeding with a description of the system, the broad underlying concepts will be described.

Each person to be identified will have previously generated a pressure pattern of his signature and will be assigned a code number. The pressure pattern which is an analog signal will be converted into a binary-coded word having a group of fields. One field indicates the number of components in the pressure pattern. Another field indicates the peak value of the pressure pattern. A further field indicates the time after the start of the signature when the peak value occurs. The length of the signature is indicated by a further field, and a final field indicates the integral of the pressure pattern. It should be noted that other characteristics could be used.

Each such pressure pattern is stored in a different register of an addressed memory. The address of the register is in one-to-one correspondence with the associated code number. Thus, when a person is to identified, he enters his code number into the system followed by the writing of his signature. The code number is used to select the prerecorded pressure pattern's binary word representation for comparison with the binary word representation of the presently generated pressure pattern. A correlation of the two binary words is performed and the degree of similarity is indicated as one of three possible alternatives. If there is a very close correlation there will be given an indication that the signature is verified. If there is a large discrepancy there will be indicated that the signature is not verified. Or, if there is a correlation between these extremes, an ambiguity will be indicated which will result in a request for the rewriting of the signature or other information. Now refer to FIG. 1.

Figure 1:
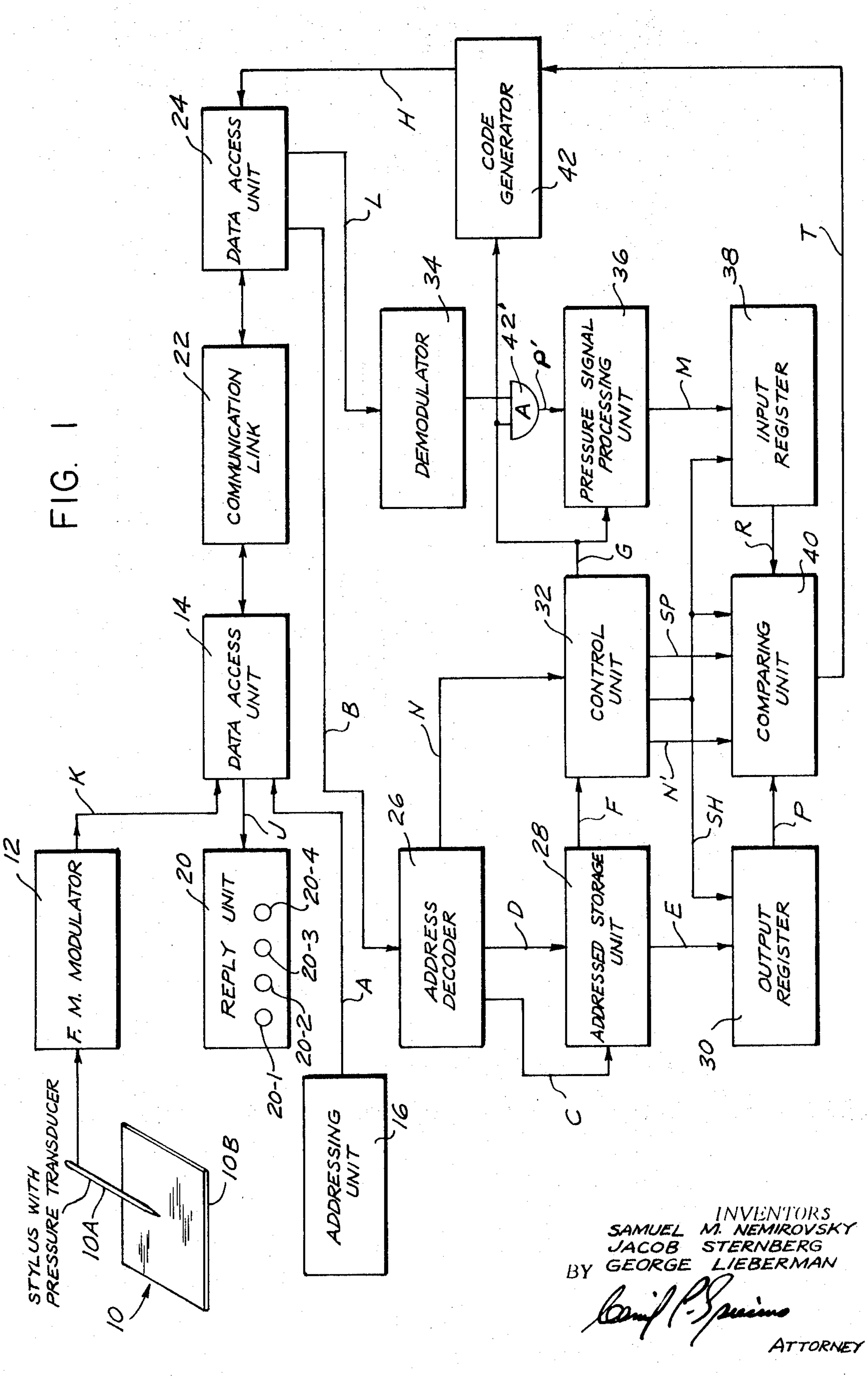
FIG. 1 shows a block diagram of apparatus for comparing the pressure pattern of a signature being written with a prerecorded pressure pattern of the same signature.

In FIG. 1 there is shown a system for practicing the invention wherein one remote terminal is connected, via a communication link, to a central station. Although only one remote terminal is shown it should be realized that one central station can service many remote terminals.

The remote terminal comprises: a pressure transducer unit 10, connected via a frequency modulator (FM) device 12 to a data access unit 14; an addressing unit 16 also connected to data access unit 14; and a reply unit 20 for receiving signals from data access unit 14. The pressure transducer unit 10, can comprise, for example, a stylus 10A and a platen 10B. Within the stylus is a pressure transducer (not shown) which converts the pressure between the tip of the stylus and the platen to a voltage signal which follows the variations of the pressure pattern. The transducer could be a strain gauge or a piezoelectric or similar device which feeds a stabilized high gain amplifier. Alternately, the stylus could be a rigid member and the platen connected to a pressure transducer. In any event, transducer unit 10 is used to convert a pressure pattern with respect to time to an analog voltage signal. The FM modulator 12 can be a conventional FM modulator which frequency modulates a carrier signal in accordance with the amplitude of the input analog voltage signal. The carrier signal can have a frequency centered in the pass band of a telephone line. The addressing unit 16 can be a tone generator having 12 keys. Whenever a key is depressed it generates a unique pair of tone signals. Ten of the keys represent the digits 0, 1, 2, ...., 9. The other two keys represent two control characters. The reply unit 20 comprises a plurality of indicator lamps and suitable driving circuits. Each of the circuits is activated by a different coded combination of pulses. The data access unit 14 provides an interface between the modulator 12, the addressing unit 16 and the reply unit 20, and the communication link 22 which can be a telephone system.

The central station comprises a data access unit 24 for interfacing with the communication link; an address decoder 26 which receives serial pairs of signals from unit 24 and converts the pairs of signals to an address code; and addressed storage unit 28 which receives address codes from decoder 26 and has a plurality of addressed storage locations or registers, each storing a unique binary coded representation of a pressure pattern; an output register 30 which can be a shift register which is jam loaded in parallel from storage unit 28 and unloaded by serial shifting; a control unit 32 which generates control signals at particular times and in particular sequences to control the operation of the central station; a demodulator 34 which converts a frequency modulated signal received from data access unit 24 to an amplitude modulated voltage signal representing a pressure pattern; a pressure signal processing unit 36 which converts the voltage signal from demodulator 34 to a binary coded combination of signals (bits) which represent characteristics of the pressure pattern and are similar to those stored in addressed storage unit 28; an input register 38 which can be a shift register which is jam loaded in parallel from processing unit 36 and unloaded by serial shifting; a comparing unit 40 which serially compares the bits from the registers 30 and 38 and transmits signals representing the ranges of similarities between the overall combinations of bits stored in such registers; and a code generator 42 which transmits different coded combinations of a tone signal to data access unit 24.

The details of the units will hereinafter be described. For the present, the above description will be adequate to describe the following overall operation of the system. It should be noted that the units are interconnected by single lines. However, such lines may be multiwire cables which will be apparent from the description to follow.

In operation, when a person is to be identified, he first enters a code number unique to him into addressing unit 16. (It will be assumed that the connection between the remote and the central has been established in the telephone network by conventional dialing.) Assume that the code number is a two digit number. The user then depresses, in series, the two appropriate digit keys of addressing unit 16. The two digits are transmitted via line A, data access unit 14, communication line 22, to data access unit 24 as 2-out-of-7 coded tones and are fed from data access unit 24 via lines B to address decoded 26 as signals on 2-out-of-7 lines. In decoder 26 the signals are binary coded and assembled in parallel to provide an address for addressed storage unit 28.

After the person enters the two address digits, he enters the first control character by depressing the appropriate key in addressing unit 16 which is decoded by address decoder 26 as a control signal on line C. The control signal is fed to addressed storage unit 28 to open the address register therein to accept the address from decoder 26, via lines D, and starts the location of the desired register whose contents are fed via lines E to output register 30. It should be noted for the example given this will be a 36-bit word which is jam set into register 30. When addressed storage unit 28 locates the desired register it transmits a signal via line F to control unit 32 which transmits a control signal, via line G: to analog gate 42', opening a path from demodulator 34 to processing unit 36; to signal processing unit 36, to initialize counters; and to code generator 42 which transmits a first coded combination of a tone signal via line H, data access unit 24, communication line 22, data access unit 14, and line J to reply unit 20 causing the lighting of lamp 20–1. The lighting of lamp 20–1 tells the user to now "write" his signature. While the writing is performed, the analog voltage signals from transducer unit 10 are converted to a frequency modulated signal by modulator device 12 and fed via line K, data access unit 14, communication line 22, data access unit 24 and line L to demodulator 34 where it is reconverted to the analog voltage signal. This voltage signal is fed via the open analog gate 42 to pressure signal processing unit 36 where it is converted to a 36-bit binary word representing the characteristics of the pressure pattern as will hereinafter be described. This word is fed via lines M and jam set into input register 38.

After the signature is completed the user then pushes the second control character button on addressing unit 16 to generate a second control character which reaches address decoder 26 in the same manner as the first control character. In response to this control character, decoder 26 transmits, via line N, a control signal to control unit 32. The signal on line G terminates closing gate 42. A signal is transmitted on line N' to initialize registers and counters in comparing unit 40. Then control unit 32 transmits 36 sequential shift pulses on line SH to registers 30 and 38 and comparing unit 40. The contents of these registers are fed via lines P and R to comparing unit 40 where they are compared on a bit-by-bit basis. Following the last shift pulse, control unit 32 transmits a sampling pulse on line SP to comparing unit 40. As will hereinafter be described, comparing unit will then transmit a signal on one of three lines in cable T depending on the result of the comparison, representing verification, nonverification, and uncertainty. In response to these signals, code generator 42 will transmit an appropriate coded combination of the tone signal on line H to data access unit 24. The signal reaches reply unit 20 in the usual manner to light an appropriate lamp. If lamp 20–2 lights, this indicates the signature has been verified; if lamp 20–3 lights, this indicates the signature clearly does not match the stored signature; and if lamp 20–4 lights, this indicates that there is an uncertainty and the signature should again be written.

The various units of the system will now be described in detail.

Although FM modulator 12, data access unit 14 and addressing unit 16 have been indicated as separate devices, they can be unified as one device. In particular, the device is a Bell 603–A DATA-SET.

The addressing unit can be the touch tone keys of the device and the output of transducer 10 can be connected to the data input of the device. Reply unit 20 can be connected to the answer back contacts of the device.

Reply unit 20 can include a decoder for decoding each of the four coded combinations of pulses generated by the answer back contacts in response to the reception of the four coded combinations of a tone signal. Each output of the decoder can drive a different lamp amplifier to light a lamp for a given period of time. The output of the DATA-SET can be connected directly into the existing telephone system.

In the central station, the data access unit 24 and the demodulator 34 which are shown as separate units can also be assembled from available telephone equipment. In particular, a Bell 401–J DATA-SET and a Bell 603–B DATA-SET can be connected via a hybrid to the telephone line. The outputs of the Bell 401–J DATA-SET provide the 2-out-of-7 signals to lines B. The output of the Bell 603–B DATA-SET provide the analog voltage signal into analog gate 42. In addition, the pulse code on line H can be connected to the answer back terminal of the Bell 603–B DATA-SET.

The address decoder 26 can be a diode decoding matrix whose outputs feed a two digit shift register. The addressed storage unit 28 can be a 100 word magnetic core matrix memory with an address register, an output register and appropriate read and rewrite clocks and sequencing circuits. The code generator 42 can be a four channel device wherein the outputs of the channels are inputs to an inclusive-or circuit whose output is connected to line H, and the inputs of the channels are connected to lines G and T. Within each channel is a logic network to generate a coded combination of pulses.

Figure 2:
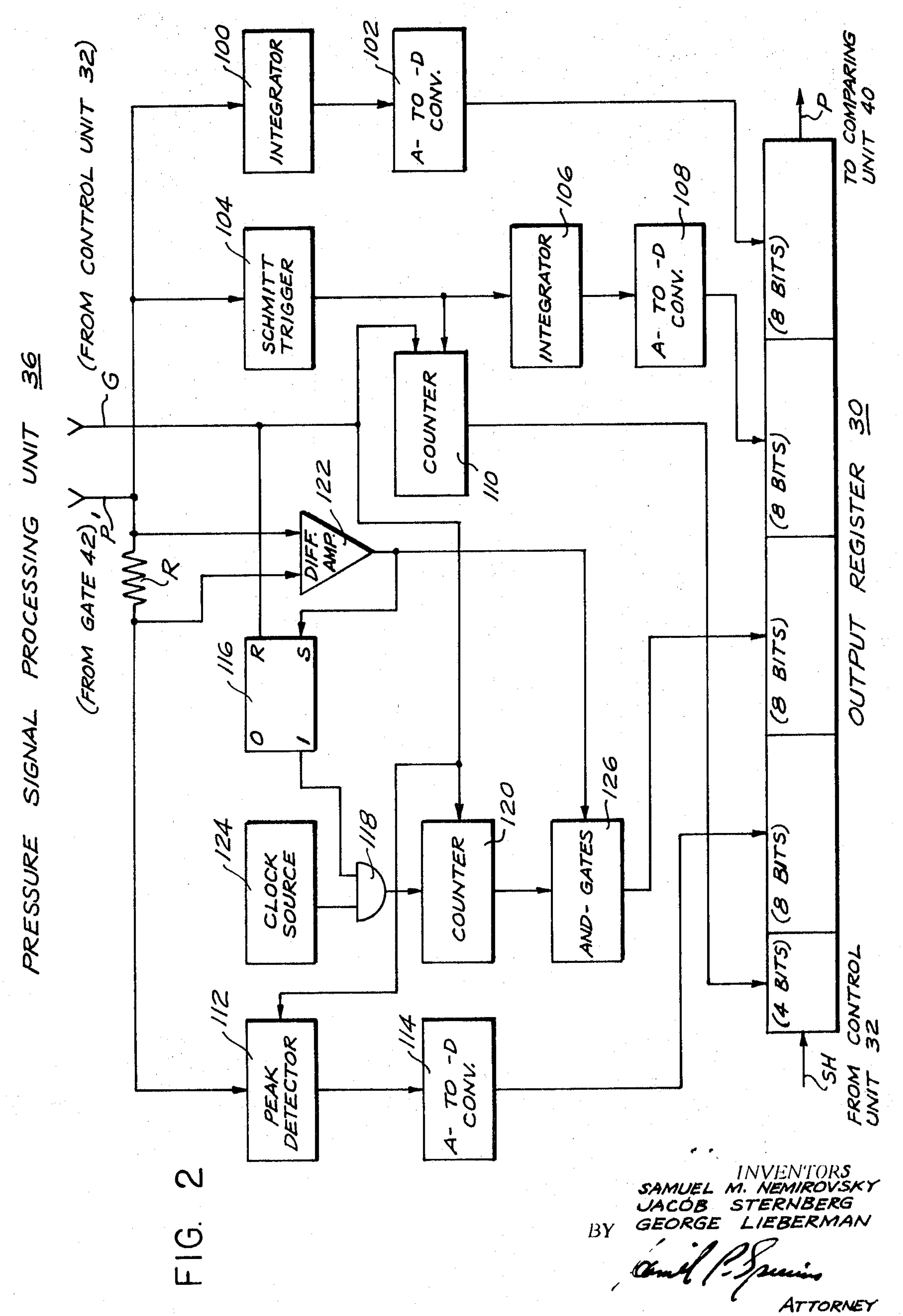
FIG. 2 shows the logic diagram of the pressure signal processing unit and the output register of the system of FIG. 1.

The pressure signal processing unit 36 is shown in FIG. 2. This unit analyzes the pressure pattern waveform from demodulator 34 and defines it as having five characteristics. The first characteristic is the integral of the pressure pattern, i.e., the integral of the pressure exerted over the period of time during which the signature is written. This is accomplished by feeding the analog voltage signal on line P' to integrator 100. The analog output of integrator 100 is fed to analog-to-digital converter 102 whose eight-bit output is jam fed into the eight most-significant bit positions of output register 30.

The next characteristic is the length of the signature, i.e., the total time elapsed in the actual writing of the signal not including the gaps in time between the writing of the different segments or names of the signature. This is accomplished by feeding the analog voltage signal on line P' via Schmitt trigger circuit 104 to integrator 106. The analog output of integrator 106 is converted to an eight-bit byte by analog-to-digital converter 108 and jam fed into the next eight most-significant bit positions of output register 30.

Another characteristic is the number of discrete segments in the pressure pattern, i.e., the number of names, initials, periods, etc. These segments are counted by counter 110 which was initially cleared by the signal on line G. What is actually counted are the leading edges of the rectangular pulses generated by Schmitt trigger 104. The output of counter 110 is fed as four bits into the four least-significant positions of output register 30. Another characteristic is the peak pressure occuring during the writing of the signature. This is measured by peak detector 112 which receives the analog voltage signal from line P'. The analog output of peak detector 112 is converted to an eight-bit digital value by analog-to-digital converter 114 and jam fed into the next eight least-significant bits of output register 30.

The last characteristic is the time of occurrence of the pressure peak after the start the signature. In order to measure this time it should be realized that peak detector 112 (a diode-capacitor combination) only draws current when the input voltage thereto exceeds the voltage across the capacitor. Therefore, peak detector 112 will draw current at the very start of the signature and whenever the pressure is greater than any previously exerted pressure. The signal on line G resets flip-flop 116 blocking AND-gate 118, and clears counter 120. The first flow of current through resistor R which occurs at the start of the signature is sensed by differential amplifier 122 and the signal therefrom sets flip-flop 116-opening AND-gate 118. Clock pulses from clock pulse source 124 are accumulated in counter 120. Thereafter, the clock pulses will be accumulated until flip-flop 116 is again reset. Each time current flows through resistor R, the signal from differential amplifier 122 opens AND-gate 128 to force load the contents of counter 120 as an eight-bit byte into the remaining eight positions of register 30. It should be noted that the value in these eight positions keeps changing as each subsequent greater pressure is sensed until the maximum pressure is sensed. Thereafter, the value remains unchanged. This last value then represents the time that the maximum pressure occurred after the start of the signature.

Figure 3:
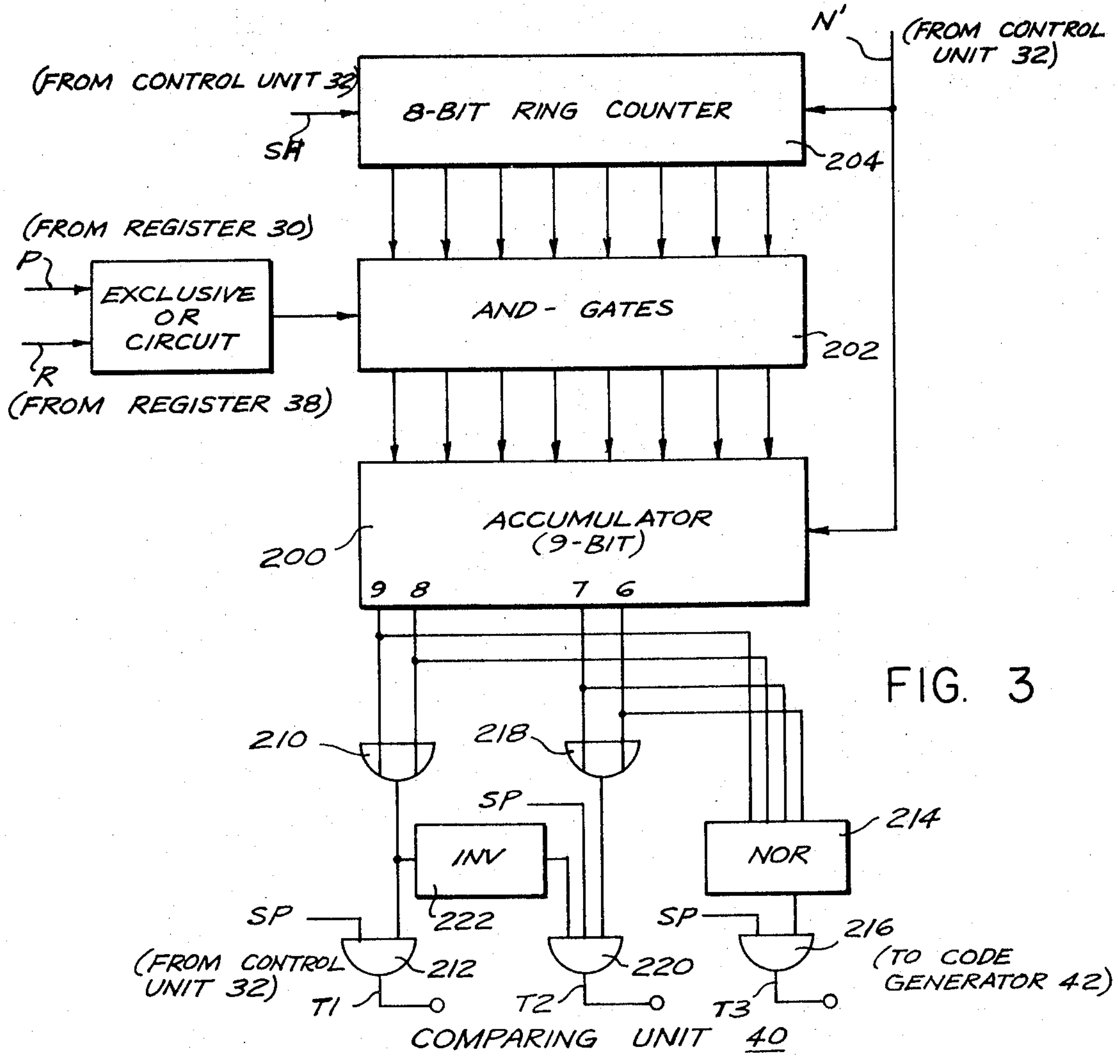
FIG. 3 shows the logic diagram of the comparing unit of FIG. 1.

The comparing unit 40 which serially compares the bits in registers 30 and 38 to determine the degree of correlation is shown in FIG. 3. Essentially the bits are compared for inequalities. Each inequality is weighted and the total weight over the 36 comparisons is accumulated. The ranges within which the total weight falls is used to indicate the degree of correlation as a signal on one of three possible lines, each associated with a different range.

In particular the weighted number is accumulated in accumulator 200 which includes a parallel adder and a storage register. As each addend is entered into the accumulator it is added to the number then stored in the register of the accumulator. The addend is supplied via AND-gates 202 from ring counter 204. AND-gates 202 are controlled by exclusive-or circuit 206 whose inputs are connected via lines P and R to output register 30 and input register 38, respectively.

Just before the correlation starts a signal on line N' from control unit 32 clears the register of accumulator 200 and sets the ring counter to a starting position. The most-significant bits from registers 30 and 38 are shifted into circuit 206 and the ring counter shifted to the eighth or most significant position by the first shift on line SH. If the bits are unequal gates 202 open and the binary number 10000000 is added into accumulator 200. The next shift pulse on line SH shifts ring counter 204 to the seventh position, and shifts the second most-significant bits of registers 30 and 38 into exclusive-or circuit 206. If there is an inequality, gates 202 open and the binary number 01000000 is added to the number 10000000 stored in the register of the accumulator 202 as a result to the inequality of the most-significant bits. If there is an equality, then gates 202 remain closed and the number in the accumulator remains unchanged. This procedure occurs for 36 shift pulses. At that time there is a number stored in accumulator 200 that is within the range of 0 to $2^9-1$.

If the number is equal to or greater than $2^8$ the entered signature and the previously recorded signature clearly do not agree and a signal is transmitted to code generator 42 via line T1. The operation is performed by OR-circuit 210 whose inputs are connected to the $2^9$ and $2^8$ outputs of accumulator 200. The output of OR-circuit 210 feeds one input of AND-gate 212 whose other input is connected to line SP which receives the sampling pulse. The output of AND-gate 212 is connected to line T1.

If the number is less than $2^6$ then the signatures are considered to agree and the written signature is verified by transmitting a signal on line T3 to code generator 42. This result is performed by NOR-circuit 214 whose inputs are connected to the $2^6$, $2^7$, $2^8$, and $2^9$ outputs of accumulator 200. The output of NOR-circuit 214 is connected to one input of AND-gate 216 whose other input receives a sampling pulse on line SP. The output of AND-gate 216 is connected to line T3.

If the number is greater than $2^6-1$ and less than $2^8$ then the correlation is ambiguous and a retry of the signature is called for by transmitting a pulse on line T2. This is accomplished by the logic network comprising OR-circuit 218 and AND-gate 220. AND-gate 220 has an output connected to line T2 and three inputs connected to inverter 222, the line SP and the output of OR-circuit 218. Inverter 222 has its input connected to the output of OR-circuit 210. The inputs of OR-circuit 218 are connected to the $2^6$ and $2^7$ outputs of accumulator 200.

Figure 4:
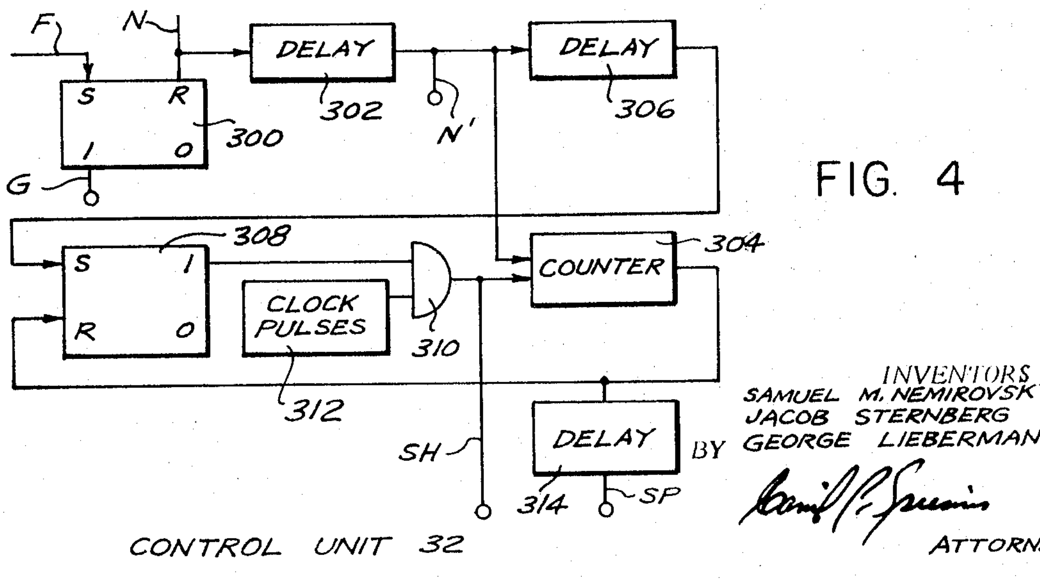
FIG. 4 shows the logic diagram of the control unit of FIG. 1.

Finally, the control unit 32, shown in FIG. 4, comprises flip-flop 300 having a set input connected to line F, a clear input connected to line N and a "1" output connected to line G. Therefore, whenever the flip-flop is set there is a signal on line G. Furthermore, line N is connected via a delay network to line N'. Hence, a short time after there is a signal on line N, there is a signal on line N'. The output of delay network 320 is connected to the clear input of counter 304 to clear the counter whenever a signal appears on line N'. In addition, the output of delay 302 is connected via delay 306 to the set input of flip-flop 308. Thus, after counter 304 is cleared flip-flop 308 is set. Since the "1" output of the flip-flop 308 is connected to one input of AND-gate 310, the gate opens and passes clock pulses from source 312, connected to the other input of AND-gate 310, to line SH and to the counting input of counter 304. Counter 304 can be a binary counter or a step counter which emits a pulse on its output after having counted 36 pulses. The output of the counter 304 is connected to the reset input of flip-flop 308. Thus, only 36 pulses appear on line SH for use as the shift pulses. In addition, the output of counter 304 is connected, via a delay 314, to line SP to provide a sampling pulse after the 36 shift pulses.

APPENDIX

The Bell 603 –A2 DATA-SET is manufactured by Western Electric Co. and described in Bell System Data Communication Technical Reference: Data Sets 603A, 603B and 603D, Apr. 1966.

The Bell 603–B2 DATA-SET is manufactured by Western Electric Co. and described in Bell System Data Communications Technical Reference: Data Sets 603A, 603B and 603D, Apr. 1966.

The Bell 401–J5 Data-set is manufactured by Western Electric Co. and described in Bell System Data Communications Technical Reference: Data Set 401J Interface Specification, Sept. 1965.

Since the other elements shown in the system are made up of standard components, and standard assemblies, reference may be had to "High Speed Computing Devices," by the Staff of Engineering Research Associates, Inc. (McGraw-Hill) Book Company, Inc., 1950); and appropriate chapters in "-Computer Handbook" (McGraw-Hill, 1962) edited by Harvey D. Huskey and Granino A. Korn, and for detailed circuitry, to the example "Principles of Transistor Circuits," edited by Richard F. Shea, published by John Wiley and Sons, Inc., New York and Chapman and Hall, Ltd., London 1953 and 1957. In addition, other references are; For system organization and components; "Logic Design of Digital Computers," by M. Phister, Jr., (John Wiley and Sons, New York); "Arithmetic Operations in Digital Computers" by R.K. Richards (D. Van Nostrand Company, Inc., New York). For circuits and details: "Digital Computer Components and Circuits," by R. K. Richards (D. Van Nostrand Company, Inc., New York); "Pulse and Digital Circuits," by Millman and Taub (McGraw-Hill Book Company, Inc.).

Especially worthwhile books for finding the components mentioned in the disclosure as "off-the-shelf" items are "-Digital Small Computer Handbook," "Digital Industrial Handbook" and "Digital Logic Handbook," 1967–69 editions copyrighted in 1967, 1968 and 1969 by the Digital Equipment Corporation of Maynard, Massachusetts.

It should be noted that modifications of the system are possible but which still fall within the scope of the invention. For example, although a conventional telephone system has been shown to link the remote and central stations, direct lines could be used in a "closed-circuit" system. Again the number of possible signatures that are stored is not limited to the example of one hundred but could be any reasonable number. Furthermore, for many signatures disc memories could be used.

Finally, although prewired hardware has been shown for the central station, it should be apparent that a suitably programmed general purpose digital computer could be used.

What is claimed is:

1. The method of verifying the signature of a person comprising the steps of measuring the pressure between a writing instrument and a writing surface when the person is writing his signature, integrating the instantaneous pressure with respect to time over the period during which the signature is being written by the person to obtain a first indicium, measuring the instantaneous peak pressure occurring during the writing of said signature to obtain a second indicium, and sensing for the time of occurrence of said instantaneous peak pressure with respect to the start of the writing of said signature to obtain a third indicium, and comparing said indicia with prerecorded values of such indicia.

2. The method of claim 11 further comprising the step of converting the obtained first, second and third indicia to a first coded combination of bits and wherein said prerecorded values of such indicia are represented by a corresponding second coded combination of bits.

3. The method of claim 2 further comprising the step of confirming the validity of the signature of the person when there is an equality between at least a given first number of corresponding bits of said first and second coded combinations of bits.

4. The method of claim 3 further comprising the step of rejecting the validity of the signature of the person when there is an equality between less than a given second number of corresponding bits of said first and second coded combinations of bits.

5. The method of claim 4 further comprising the step of indicating an ambiguity in the validity of the signature of the person when there is an equality of a number of corresponding bits of said first and second coded combinations of bits which is between said first and second numbers.

6. Signature identifying apparatus comprising transducer means for converting pressure variations between a writing instrument and a writing surface when a signature is being written to an electrical signal, processing means for representing the time integral of said electrical signal as a first indicium, for representing the peak amplitude of the electrical signal as a second indicium and for representing the time of occurrence of said peak amplitude as a third indicium, means for combining said indicia into a first coded combination of binary signals, memory means for storing in a plurality of addressed registers second coded combinations of binary signals, addressing means for generating identifying addresses associated with the addressed registers, comparing means receiving said first coded combination of binary signals and a second coded combination of binary signals from a register of said memory means, as indicated by said addressing means, for comparing the so received coded combinations of binary signals and indicating the degree of similarity between said so received coded combinations of binary signals.

7. The identifying apparatus of claim 6 wherein said comparing means generates one of the following indications: substantial equality, inequality and ambiguity for each comparison.

8, The identifying apparatus of claim 7 wherein said transducer means is remote from said memory means and said transducer means is remote from said memory means and said comparing means, and further comprising indicator means in proximity with said transducer means, means connected to said comparing means for generating indication signals in accordance with the indications generated by said comparing means, and means for transmitting said indication signals to said indicator means.

* * * * *